United States Patent
Wu

(10) Patent No.: US 10,476,914 B2
(45) Date of Patent: Nov. 12, 2019

(54) DEVICE AND METHOD FOR PERFORMING AN INTERNET PROTOCOL MULTIMEDIA SUBSYSTEM SERVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

(*) Notice: Subject to any disclaimer, the term of this patent is extended or adjusted under 35 U.S.C. 154(b) by 92 days.

(21) Appl. No.: 15/893,698

(22) Filed: Feb. 12, 2018

(65) Prior Publication Data

US 2018/0234466 A1 Aug. 16, 2018

Related U.S. Application Data

(60) Provisional application No. 62/459,613, filed on Feb. 16, 2017, provisional application No. 62/490,563, filed on Apr. 26, 2017.

(51) Int. Cl.
*H04L 29/06* (2006.01)
*H04L 29/08* (2006.01)
*H04W 76/12* (2018.01)

(52) U.S. Cl.
CPC ...... *H04L 65/1016* (2013.01); *H04L 65/1003* (2013.01); *H04L 65/1069* (2013.01); *H04W 76/12* (2018.02); *H04L 65/1073* (2013.01); *H04L 67/147* (2013.01)

(58) Field of Classification Search
None
See application file for complete search history.

(56) References Cited

U.S. PATENT DOCUMENTS

2015/0230199 A1 8/2015 Jeong
2017/0289046 A1* 10/2017 Faccin .................. H04L 47/20

FOREIGN PATENT DOCUMENTS

WO 2012/019811 A1 2/2012

OTHER PUBLICATIONS

3GPP TS 23.501 V0.2.0, Jan. 2017.
3GPP TS 23.502 V0.2.0, Feb. 2017.
(Continued)

*Primary Examiner* — Brian Whipple
(74) *Attorney, Agent, or Firm* — Winston Hsu

(57) ABSTRACT

A network for performing an IMS service with a communication device comprises a storage device for storing instructions and a processing circuit coupled to the storage device. The storage device stores, and the processing circuit is configured to execute instructions of receiving a Protocol Data Unit (PDU) Session Establishment Request message requesting to establish a PDU Session for the IMS service, from the communication device; transmitting a PDU Session Establishment Accept message configuring the PDU Session to the communication device; configuring a plurality of data radio bearers (DRBs) associated to the PDU Session to the communication device; communicating a plurality of IMS signaling messages for the IMS service on a first DRB of the plurality of DRBs with the communication device; and communicating a plurality of IMS data packets for the IMS service on a second DRB of the plurality of DRBs with the communication device.

13 Claims, 9 Drawing Sheets

(56) References Cited

OTHER PUBLICATIONS

"3rd Generation Partnership Project;Technical Specification Group Services and System Aspects; Procedures for the 5G System;Stage 2;(Release 15)", 3GPP TS 23.502 V0.1.1 (Jan. 2017), pgaes 1-46.
Office action dated Dec.10, 2018 for the Taiwan application No. 107105388, filing date Feb. 14, 2018, pp. 1-10.
Search Report dated May 3, 2018 for EP application No. 18156723. 1, pp. 1-6.
Ericsson, "23.502: 5GC-EPC interworking", SA WG2 Meeting #119, S2-170805, Feb. 13-17, 2017, Dubrovnik, Croatia, XP051216926, pp. 1-6.
3GPP TR 23.799 V14.0.0 (Dec. 2016), 3rd Generation Partnership Project; Technical Specification Group Services and System Aspects; Study on Architecture for Next Generation System (Release 14), XP051295448, pp. 1-522.

\* cited by examiner

DEVICE AND METHOD FOR PERFORMING AN INTERNET PROTOCOL MULTIMEDIA SUBSYSTEM SERVICE

CROSS REFERENCE TO RELATED APPLICATIONS

This application claims the benefit of U.S. Provisional Applications No. 62/459,613, filed on Feb. 16, 2017, and No. 62/490,563, filed on Apr. 26, 2017, which are incorporated herein by reference.

BACKGROUND OF THE INVENTION

1. Field of the Invention

The present invention relates to a device and a method used in a wireless communication system, and more particularly, to a device and a method of performing an Internet Protocol (IP) Multimedia Subsystem (IMS) Service.

2. Description of the Prior Art

The fifth generation (5G) system architecture is defined to provide a better performance of system service. The 5G system architecture enables techniques such as Network Function Virtualization and Software Defined Networking.

SUMMARY OF THE INVENTION

The present invention therefore provides a communication device and method for performing an Internet Protocol (IP) Multimedia Subsystem (IMS) Service to solve the abovementioned problem.

A network for performing an IMS service with a communication device comprises a storage device for storing instructions and a processing circuit coupled to the storage device. The storage device stores, and the processing circuit is configured to execute instructions of receiving a Protocol Data Unit (PDU) Session Establishment Request message requesting to establish a PDU Session for the IMS service, from the communication device; transmitting a PDU Session Establishment Accept message configuring the PDU Session to the communication device, in response to the PDU Session Establishment Request message; configuring a plurality of data radio bearers (DRBs) associated to the PDU Session for the IMS service to the communication device; communicating a plurality of IMS signaling messages for the IMS service on a first DRB of the plurality of DRBs with the communication device; and communicating a plurality of IMS data packets for the IMS service on a second DRB of the plurality of DRBs with the communication device.

A communication device for performing an IMS service with a network comprises a storage device for storing instructions and a processing circuit coupled to the storage device. The storage device stores, and the processing circuit is configured to execute instructions of transmitting a PDU Session Establishment Request message requesting to establish a PDU Session for the IMS service, to the network; receiving a PDU Session Establishment Accept message configuring the PDU Session from the network, in response to the PDU Session Establishment Request message; configuring a plurality of DRBs associated to the PDU Session for the IMS service according to at least one configuration received from the network; communicating a plurality of IMS signaling messages for the IMS service on a first DRB of the plurality of DRBs with the network; and communicating a plurality of IMS data packets for the IMS service on a second DRB of the plurality of DRBs with the network.

A first communication device for performing an IMS service with a second communication device comprises a storage device for storing instructions and a processing circuit coupled to the storage device. The storage device stores, and the processing circuit is configured to execute instructions of performing a first PDU Session Establishment procedure to establish a first PDU Session for transmitting a plurality of IMS signaling messages for the IMS service with the second communication device; performing a second PDU Session Establishment procedure to establish a second PDU Session for transmitting a plurality of IMS data packets for the IMS service with the second communication device; configuring a first DRB associated to the first PDU Session to communicate with the second communication device; communicating the plurality of IMS signaling messages for the IMS service on the first DRB with the second communication device; configuring a second DRB associated to the second PDU Session to communicate with the second communication device; and communicating the plurality of IMS data packets for the IMS service on the second DRB with the second communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
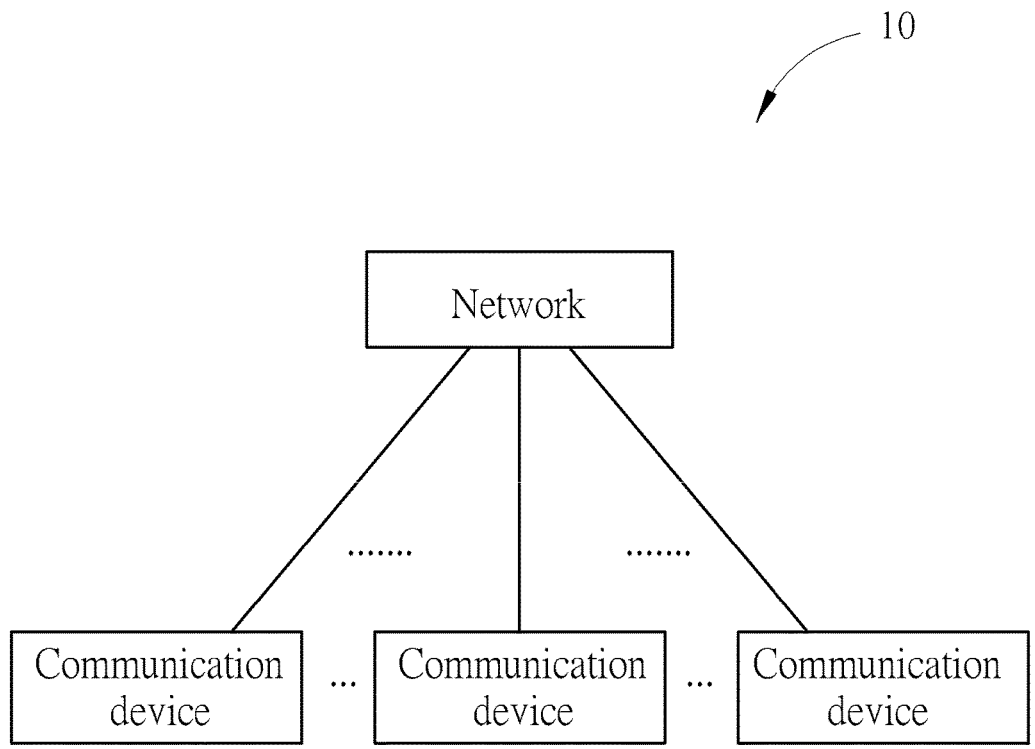
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may communicate with each other via one or multiple cells (e.g., one or multiple carriers) belonging to one or multiple base station (BS).

In FIG. 1, the network and the communication devices are simply utilized for illustrating the structure of the wireless communication system 10. Practically, the network includes a fifth generation (5G) radio access network including a 5G BS and a 5G core network (5GC). The 5G BS may be a gNB or an evolved long-term evolution (LTE) eNB.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
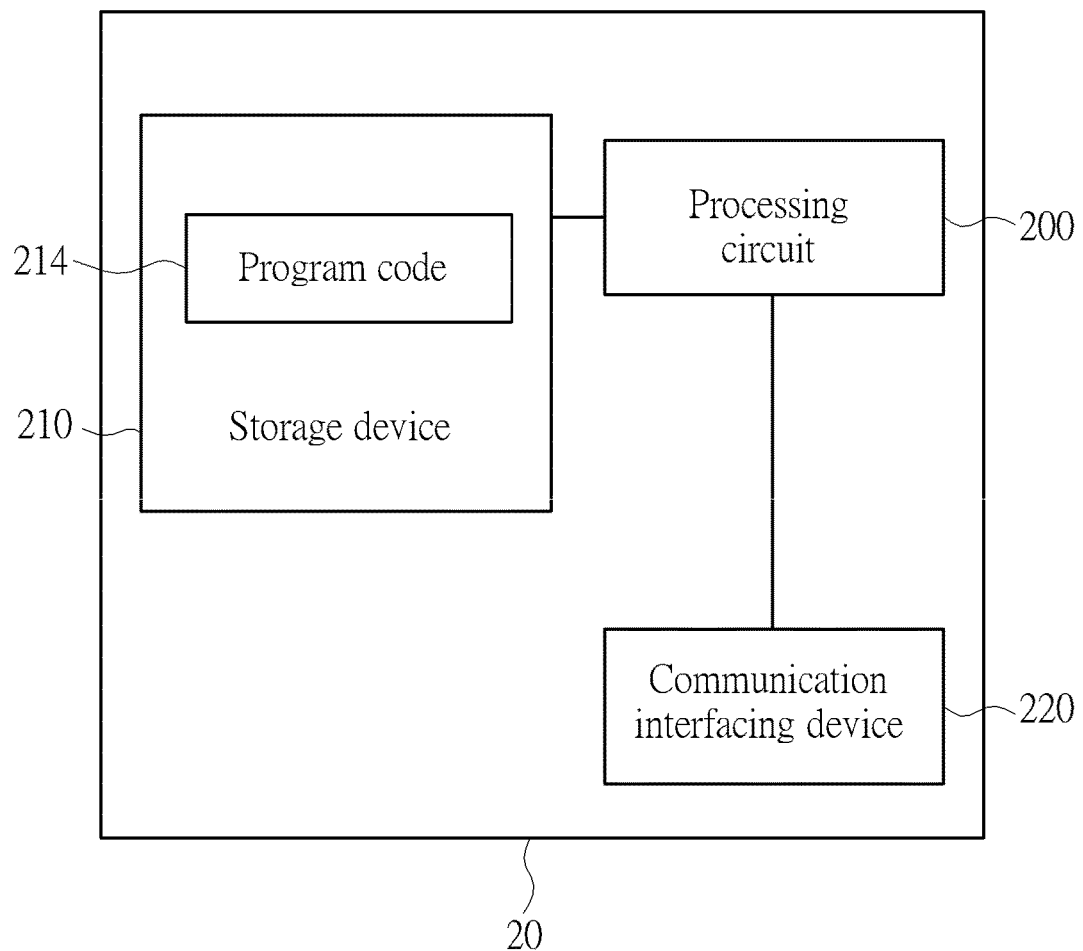
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit, a storage device 210 and a communication interfacing device 220. The storage device 210 may be any data storage device that may store a program code 214, accessed and executed by the processing circuit 200. Examples of the storage device 210 include but are not limited to a subscriber identity module, read-only memory, flash memory, random-access memory, hard disk, optical data storage device, non-volatile storage device, non-transitory computer-readable medium (e.g., tangible media), etc. The communication interfacing device 220 preferably a transceiver and is used to transmit and receive signals (e.g., data, messages and/or packets) according to processing results of the processing circuit 200.

In the following examples, a UE is used to represent a communication device in FIG. 1, to simplify the illustration of the embodiments. A network is used to present the network in FIG. 1.

Figure 3:
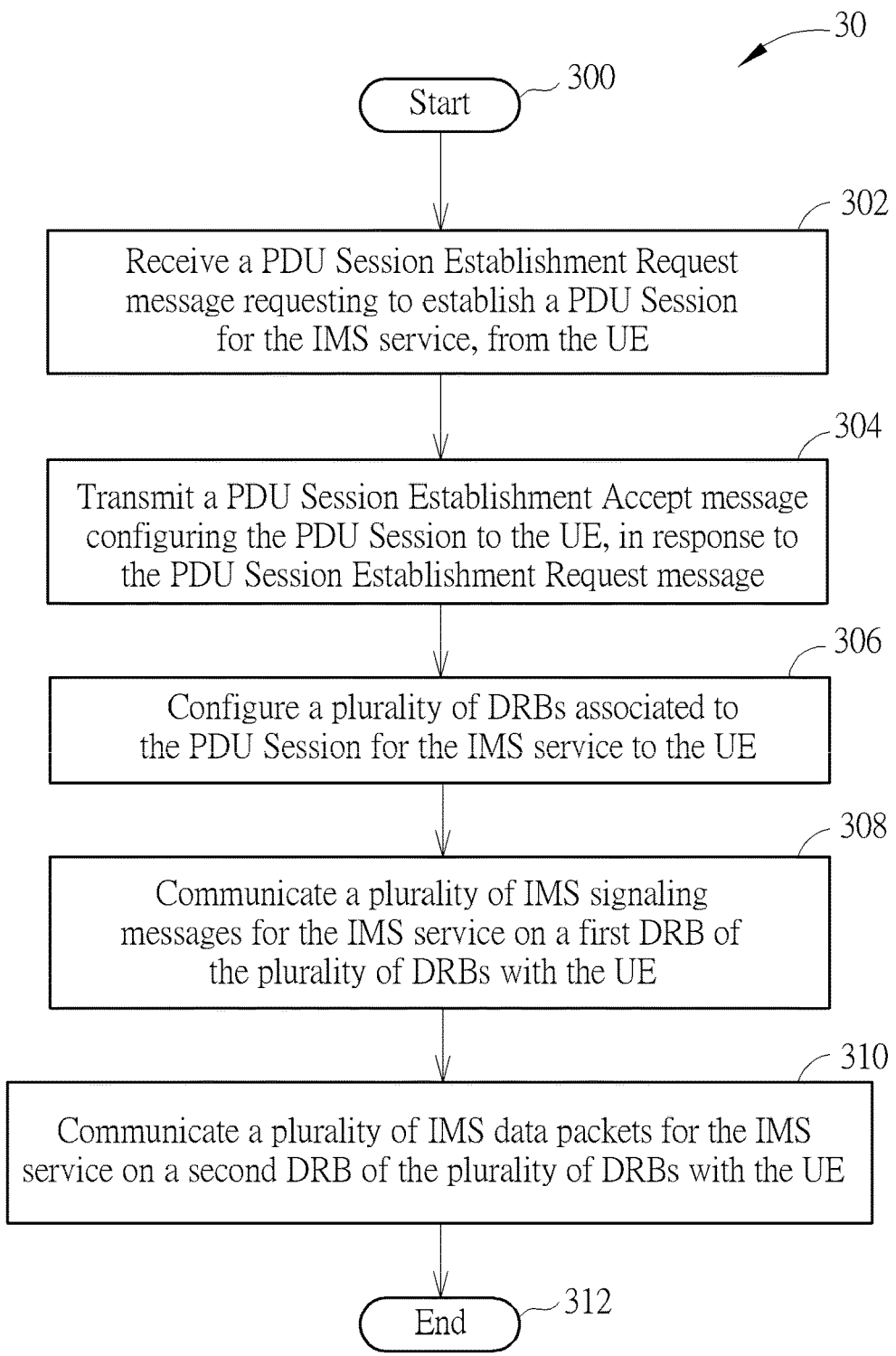
FIG. 3 is a flowchart of a process according to an example of the present invention.

A process 30 as shown in FIG. 3 is utilized in a network, to perform an Internet Protocol (IP) Multimedia Subsystem (IMS) service with a UE, and includes the following steps:

Step 300: Start.

Step 302: Receive a Protocol Data Unit (PDU) Session Establishment Request message requesting to establish a PDU Session for the IMS service, from the UE.

Step 304: Transmit a PDU Session Establishment Accept message configuring the PDU Session to the UE, in response to the PDU Session Establishment Request message.

Step 306: Configure a plurality of data radio bearers (DRBs) associated to the PDU Session for the IMS service to the UE.

Step 308: Communicate a plurality of IMS signaling messages for the IMS service on a first DRB of the plurality of DRBs with the UE.

Step 310: Communicate a plurality of IMS data packets for the IMS service on a second DRB of the plurality of DRBs with the UE.

Step 312: End.

Figure 4:
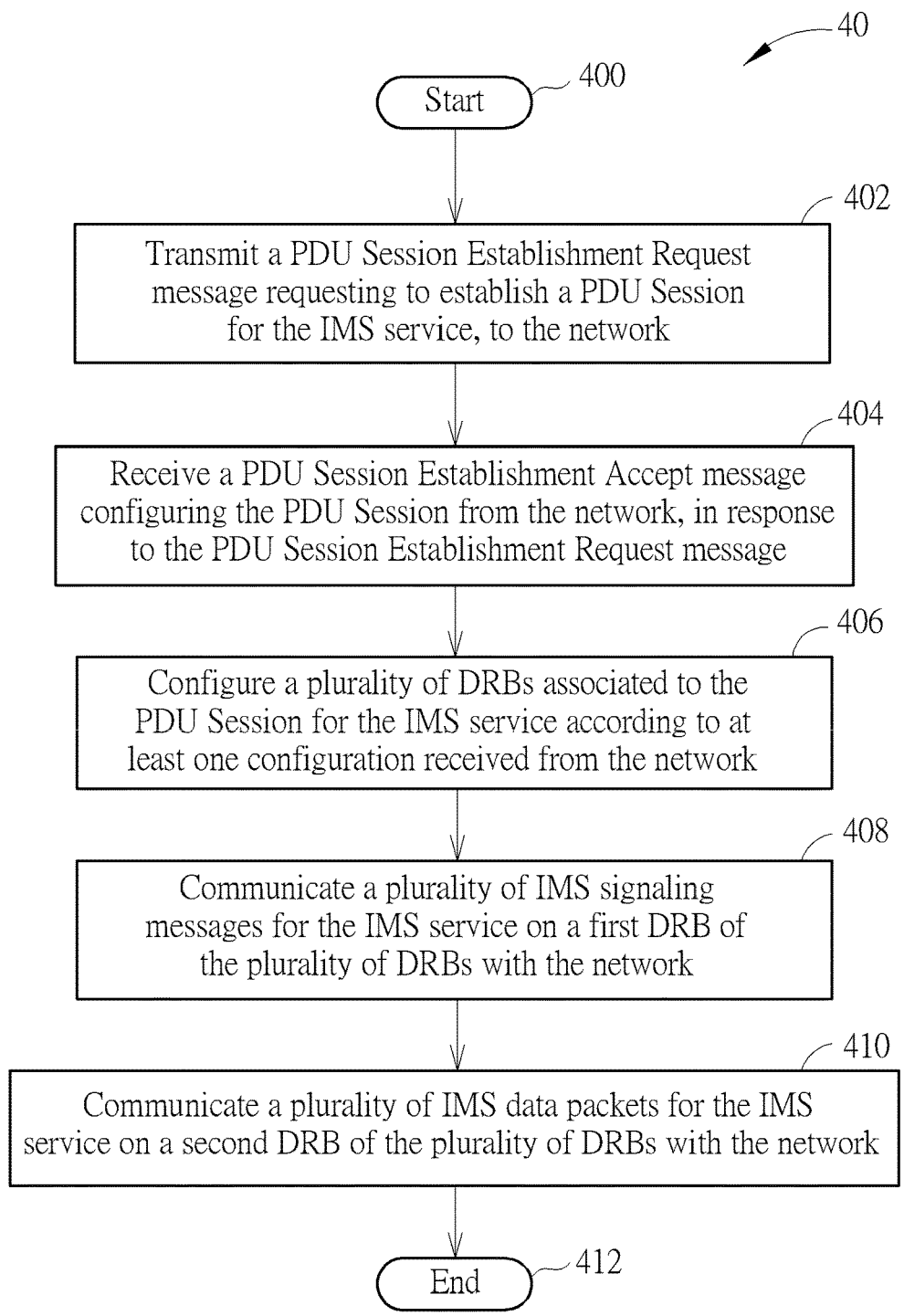
FIG. 4 is a flowchart of a process according to an example of the present invention.

A process 40 as shown in FIG. 4 is utilized in a UE, to perform an IMS service with a network, and includes the following steps:

Step 400: Start.

Step 402: Transmit a PDU Session Establishment Request message requesting to establish a PDU Session for the IMS service, to the network.

Step 404: Receive a PDU Session Establishment Accept message configuring the PDU Session from the network, in response to the PDU Session Establishment Request message.

Step 406: Configure a plurality of DRBs associated to the PDU Session for the IMS service according to at least one configuration received from the network.

Step 408: Communicate a plurality of IMS signaling messages for the IMS service on a first DRB of the plurality of DRBs with the network.

Step 410: Communicate a plurality of IMS data packets for the IMS service on a second DRB of the plurality of DRBs with the network.

Step 412: End.

The following examples may be applied to the processes 30-40.

In one example, the plurality of IMS signaling messages is a plurality of Session Initiation Protocol (SIP) messages.

In one example, the IMS service includes (or simply is) an IMS voice call, and the plurality of IMS data packets include a plurality of IMS voice packets. In one example, the IMS service includes (or simply is) an IMS video call, and the plurality of IMS data packets include a plurality of IMS video packets.

In one example, the network configures a third DRB associated to the PDU Session for the IMS service to the UE, if the IMS service is an IMS video service. Then, the network communicates (e.g., transmits or receives) a plurality of IMS voice packets for the IMS video service on the second DRB with (e.g., to or from) the UE, and communicates a plurality of IMS video packets for the IMS video service on the third DRB with the UE.

In one example, the network configures the first DRB associated to the PDU Session to the UE, by transmitting a first radio resource control (RRC) configuration (e.g., a first DRB configuration) including a PDU Session identity of the PDU Session and a first DRB identity of the first DRB to the UE. The network configures the second DRB associated to the PDU Session to the UE, by transmitting a second RRC configuration (e.g., a second DRB configuration) including the PDU Session identity of the PDU Session and a second DRB identity of the second DRB to the UE. When receiving the first RRC configuration and the second RRC configuration, the UE knows that the two DRBs (i.e., the first DRB and the second DRB) are associated to the PDU Session according to the first DRB identity, the second DRB identity and the PDU Session identity.

In one example, the network configures the third DRB associated to the PDU Session to the UE, by transmitting a third RRC configuration (e.g., a third DRB configuration) including the PDU Session identity of the PDU Session and a third DRB identity of the third DRB to the UE. When receiving the first RRC configuration, the second RRC configuration and the third RRC configuration, the UE knows that the three DRBs (i.e., the first DRB, the second DRB and the third DRB) are associated to the PDU Session according to the first DRB identity, the second DRB identity, the third DRB identity and the PDU Session identity.

In one example, the PDU Session is assigned an IP address, when a PDU Session type of the PDU Session is an IP. In one example, the network allocates an IP address to the UE in the PDU Session Establishment Accept message. In one example, the network allocates the IP address to the UE, after a PDU Session Establishment procedure is performed according to a Dynamic Host Configuration Protocol (DHCP). The network may allocate the IP address in a DHCP message transmitted to the UE. The network transmits the plurality of IMS signaling messages and the plurality of IMS data packets to the UE according to the IP address (e.g., a destination IP address). The UE transmits the plurality of IMS signaling messages and the plurality of IMS data packets to the network according to the IP address (e.g., a source IP address).

In one example, the network configures the first DRB to the UE, when transmitting the PDU Session Establishment Accept message to the UE, or when receiving a Service Request message from the UE. In one example, the network configures the second DRB to the UE, when transmitting the PDU Session Establishment Accept message to the UE, or when receiving the Service Request message from the UE. In one example, the network configures the second DRB to the UE, when receiving an IMS signaling message for initiating the IMS service (or the IMS video service) from the UE. For example, the IMS signaling message may be a SIP message (e.g., an INVITE message). In one example, the network configures the third DRB to the UE, when receiving the IMS signaling message for initiating the IMS video service from the UE.

In one example, the UE configures the third DRB associated to the PDU Session for the IMS service according to the third RRC configuration received from the network, if the IMS service is an IMS video service. Then, the UE communicates (e.g., transmits or receives) a plurality of IMS voice packets for the IMS video service on the second DRB with (e.g., to or from) the network, and communicates a plurality of IMS video packets for the IMS video service on the third DRB with the network.

In one example, the UE may or may not include a PDU Session identity of the PDU Session in the PDU Session Establishment Request message. The network may or may not include the PDU Session identity of the PDU Session in the PDU Session Establishment Accept message.

Figure 5:
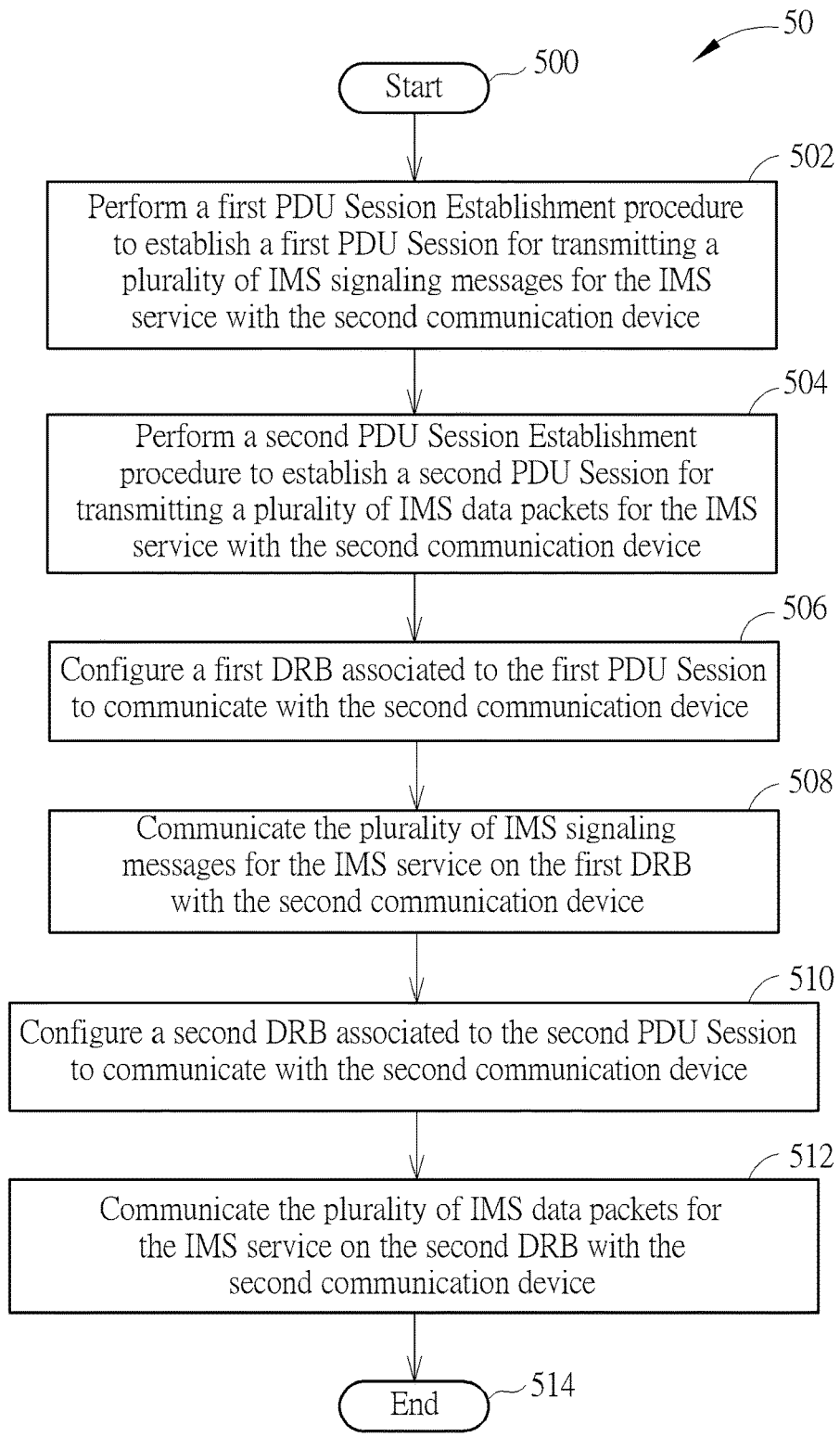
FIG. 5 is a flowchart of a process according to an example of the present invention.

A process 50 as shown in FIG. 5 is utilized in a first communication device, to perform an IMS service with a second communication device, and includes the following steps:

Step 500: Start.

Step 502: Perform a first PDU Session Establishment procedure to establish a first PDU Session for transmitting a plurality of IMS signaling messages for the IMS service with the second communication device.

Step 504: Perform a second PDU Session Establishment procedure to establish a second PDU Session for transmitting a plurality of IMS data packets for the IMS service with the second communication device.

Step 506: Configure a first DRB associated to the first PDU Session to communicate with the second communication device.

Step 508: Communicate the plurality of IMS signaling messages for the IMS service on the first DRB with the second communication device.

Step 510: Configure a second DRB associated to the second PDU Session to communicate with the second communication device.

Step 512: Communicate the plurality of IMS data packets for the IMS service on the second DRB with the second communication device.

Step 514: End.

The following examples may be applied to the process 50.

In one example, the first communication device is a UE, and the second communication device is a network. In one example, the first communication device is the network, and the second communication device is the UE.

In one example, the network configures the first DRB by transmitting a first RRC configuration to the UE. The network configures the second DRB by transmitting a second RRC configuration to the UE. The UE configures the first DRB according to the first RRC configuration received from the network. The UE configures the second DRB according to a second RRC configuration received from the network. Example of details may refer to the description for the processes 30-40.

In one example, the first communication device configures the second DRB and a third DRB associated to the second PDU Session to communicate with the second communication device, if the IMS service is an IMS video service. The second PDU Session is for transmitting a plurality of IMS voice packets and a plurality of IMS video packets for the IMS video service to the second communication device. The first communication device transmits the plurality of IMS voice packets for the IMS video service on the second DRB to the second communication device, and transmits the plurality of IMS video packets for the IMS video service on the third DRB to the second communication device.

In one example, the first PDU Session Establishment procedure and the second PDU Session Establishment procedure are UE-initiated PDU Session Establishment procedures. The UE may transmit a first PDU Session Establishment Request message and a second PDU Session Establishment Request message to the network to perform the first DU Session Establishment procedure and second PDU Session Establishment procedure. The detail can be referred to the examples of the processes 60-70, and is not narrated herein. In one example, the first PDU Session Establishment procedure is a UE-initiated PDU Session Establishment procedure, and the second PDU Session Establishment procedure is a network-initiated PDU Session Establishment procedure. The UE may transmit a first PDU Session Establishment Request message to the network to perform the first PDU Session Establishment procedure. The network may transmit an Activate PDU Session Establishment Request message to the UE to perform the second PDU Session Establishment procedure. The detail can be referred to the examples of the processes 80-90, and is not narrated herein.

Figure 6:
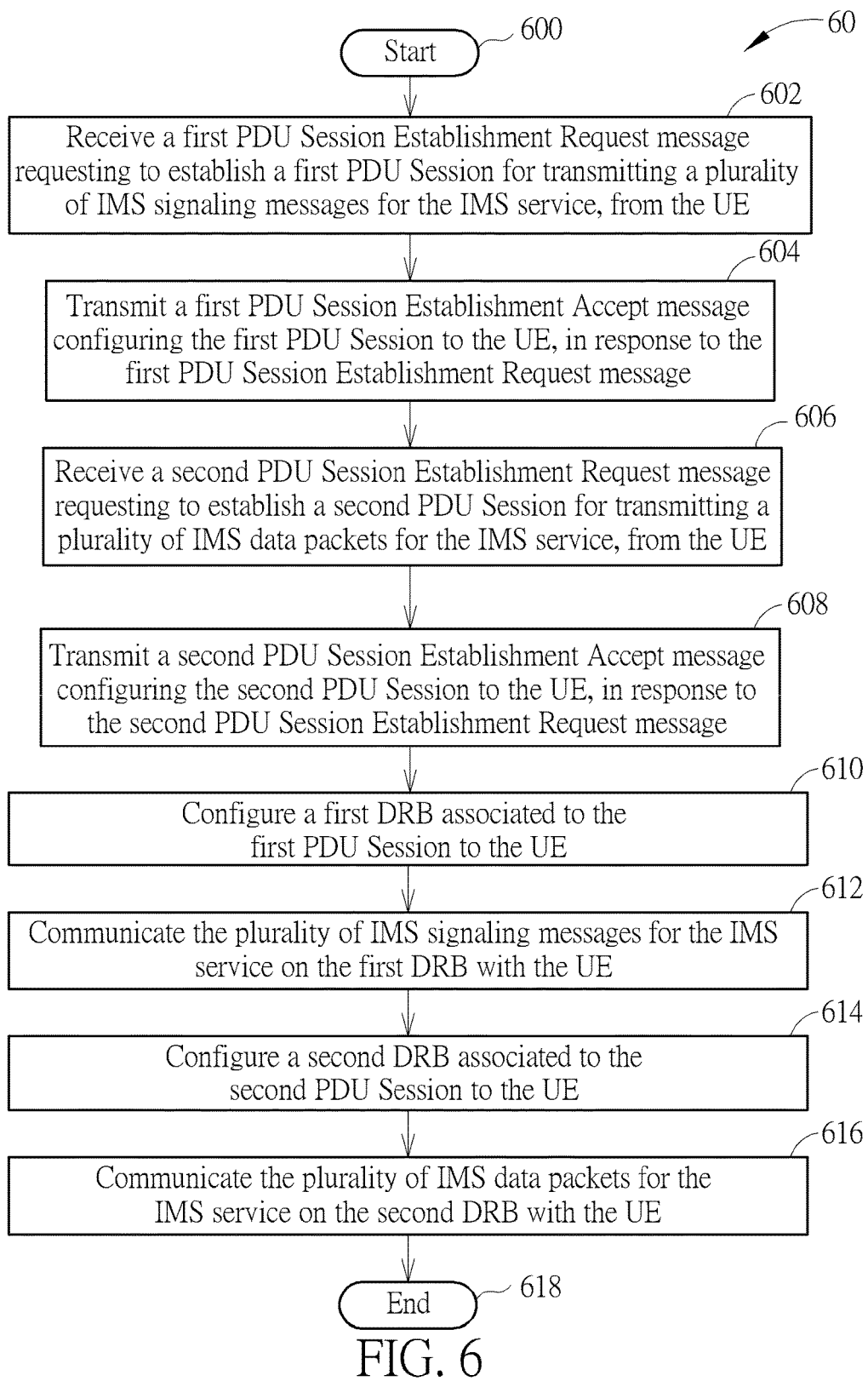
FIG. 6 is a flowchart of a process according to an example of the present invention.

A process 60 as shown in FIG. 6 is utilized in a network, to perform an IMS service with a UE, and includes the following steps:

Step 600: Start.

Step 602: Receive a first PDU Session Establishment Request message requesting to establish a first PDU Session for transmitting a plurality of IMS signaling messages for the IMS service, from the UE.

Step 604: Transmit a first PDU Session Establishment Accept message configuring the first PDU Session to the UE, in response to the first PDU Session Establishment Request message.

Step 606: Receive a second PDU Session Establishment Request message requesting to establish a second PDU Session for transmitting a plurality of IMS data packets for the IMS service, from the UE.

Step 608: Transmit a second PDU Session Establishment Accept message configuring the second PDU Session to the UE, in response to the second PDU Session Establishment Request message.

Step 610: Configure a first DRB associated to the first PDU Session to the UE.

Step 612: Communicate the plurality of IMS signaling messages for the IMS service on the first DRB with the UE.

Step 614: Configure a second DRB associated to the second PDU Session to the UE.

Step 616: Communicate the plurality of IMS data packets for the IMS service on the second DRB with the UE.

Step 618: End.

According to the process 60, the first PDU Session Establishment procedure (i.e., Steps 602 and 604) and the second PDU Session Establishment procedure (i.e., Steps 606 and 608) are initiated by the UE.

Figure 7:
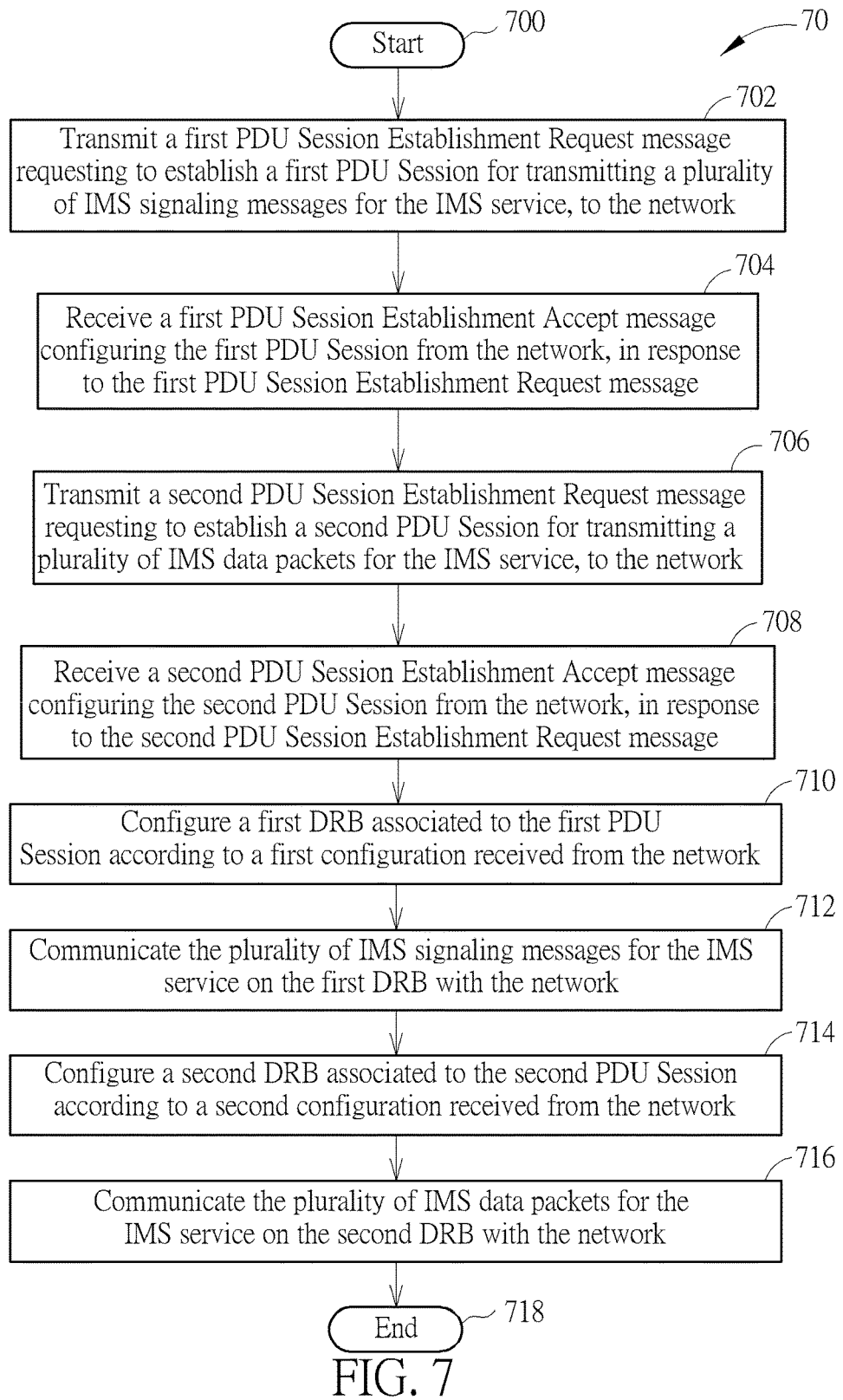
FIG. 7 is a flowchart of a process according to an example of the present invention.

A process 70 as shown in FIG. 7 is utilized in a UE, to perform an IMS service with a network, and includes the following steps:

Step 700: Start.

Step 702: Transmit a first PDU Session Establishment Request message requesting to establish a first PDU Session for transmitting a plurality of IMS signaling messages for the IMS service, to the network.

Step 704: Receive a first PDU Session Establishment Accept message configuring the first PDU Session from the network, in response to the first PDU Session Establishment Request message.

Step 706: Transmit a second PDU Session Establishment Request message requesting to establish a second PDU Session for transmitting a plurality of IMS data packets for the IMS service, to the network.

Step 708: Receive a second PDU Session Establishment Accept message configuring the second PDU Session from the network, in response to the second PDU Session Establishment Request message.

Step 710: Configure a first DRB associated to the first PDU Session according to a first configuration received from the network.

Step 712: Communicate the plurality of IMS signaling messages for the IMS service on the first DRB with the network.

Step 714: Configure a second DRB associated to the second PDU Session according to a second configuration received from the network.

Step 716: Communicate the plurality of IMS data packets for the IMS service on the second DRB with the network.

Step 718: End.

According to the process 70, the first PDU Session Establishment procedure (i.e., Steps 702 and 704) and the second PDU Session Establishment procedure (i.e., Steps 706 and 708) are initiated by the UE.

The following examples may be applied to the processes 60-70.

In one example, the UE transmits the second PDU Session Establishment Request message, when receiving a trigger message from the network. In one example, the network transmits the trigger message, when receiving an IMS signaling message (e.g., an INVITE message) from the UE on the first DRB. In one example, the UE transmits at least one of the first PDU Session Establishment Request message and the second PDU Session Establishment Request message, when initiating the IMS service. In one example, the UE transmits the at least one of the first PDU Session Establishment Request message and the second PDU Session Establishment Request message, when initiating an IMS registration procedure.

In one example, the network associates the second PDU Session to the first PDU Session in the second PDU Session Establishment Accept message. For example, the network includes a first PDU Session identity of the first PDU Session in the second PDU Session Establishment Accept message. Thus, the UE knows the second PDU Session associated to the first PDU Session. In one example, the UE associates the second PDU Session to the first PDU Session, and includes the first PDU Session identity of the first PDU Session in the second PDU Session Establishment Request message to indicate the second PDU Session associated to the first PDU Session to the network.

In one example, the network does not include any IP address in the second PDU Session Establishment Accept message. Thus, the UE knows that the first PDU Session and the second PDU Session share the same IP address. In one example, the network indicates that the first PDU Session and the second PDU Session share the same IP address in the second PDU Session Establishment Accept message. In one example, the network allocates an IP address to the UE in the first PDU Session Establishment Accept message. In one example, the network allocates the IP address to the UE in the second PDU Session Establishment Accept message.

In one example, the network transmits the plurality of IMS signaling messages and the plurality of IMS data packets to the UE according to the IP address (e.g., a destination IP address). The UE transmits the plurality of IMS signaling messages and the plurality of IMS data packets to the network according to the IP address (e.g., a source IP address).

In one example, the network allocates the IP address to the UE according to a DHCP instead of the first PDU Session Establishment procedure and the second PDU Session Establishment procedure. The network configures the second PDU Session associated to the first PDU Session in the second PDU Session Establishment Accept message. The network allocates the IP address in a DHCP message transmitted to the UE.

In one example, the UE receives the first configuration and the second configuration in one or more RRC messages from the network. In one example, to associate the first DRB to the first PDU Session, a first RRC message may indicate a first DRB identity of the first DRB associated to a first PDU Session identity of the first PDU Session. For example, the first DRB configuration includes the first DRB identity and the first PDU Session identity. In one example, to associate the second DRB to the second PDU Session, a second RRC message may indicate a second DRB identity of the second DRB associated to a second PDU Session identity of the second PDU Session. For example, the second DRB configuration includes the second DRB identity and the second PDU Session identity. In one example, the first RRC message and the second RRC message may be same or different.

The following examples may be applied to the process processes 50-70 or consist of a new invention.

In one example, the UE includes the first PDU Session identity in the first PDU Session Establishment Request message. The network may or may not include the first PDU Session identity in the first PDU Session Establishment Accept message. In one example, the UE includes the second PDU Session identity in the second PDU Session Establishment Request message. The network may or may not include the second PDU Session identity in the second PDU Session Establishment Accept message.

Figure 8:
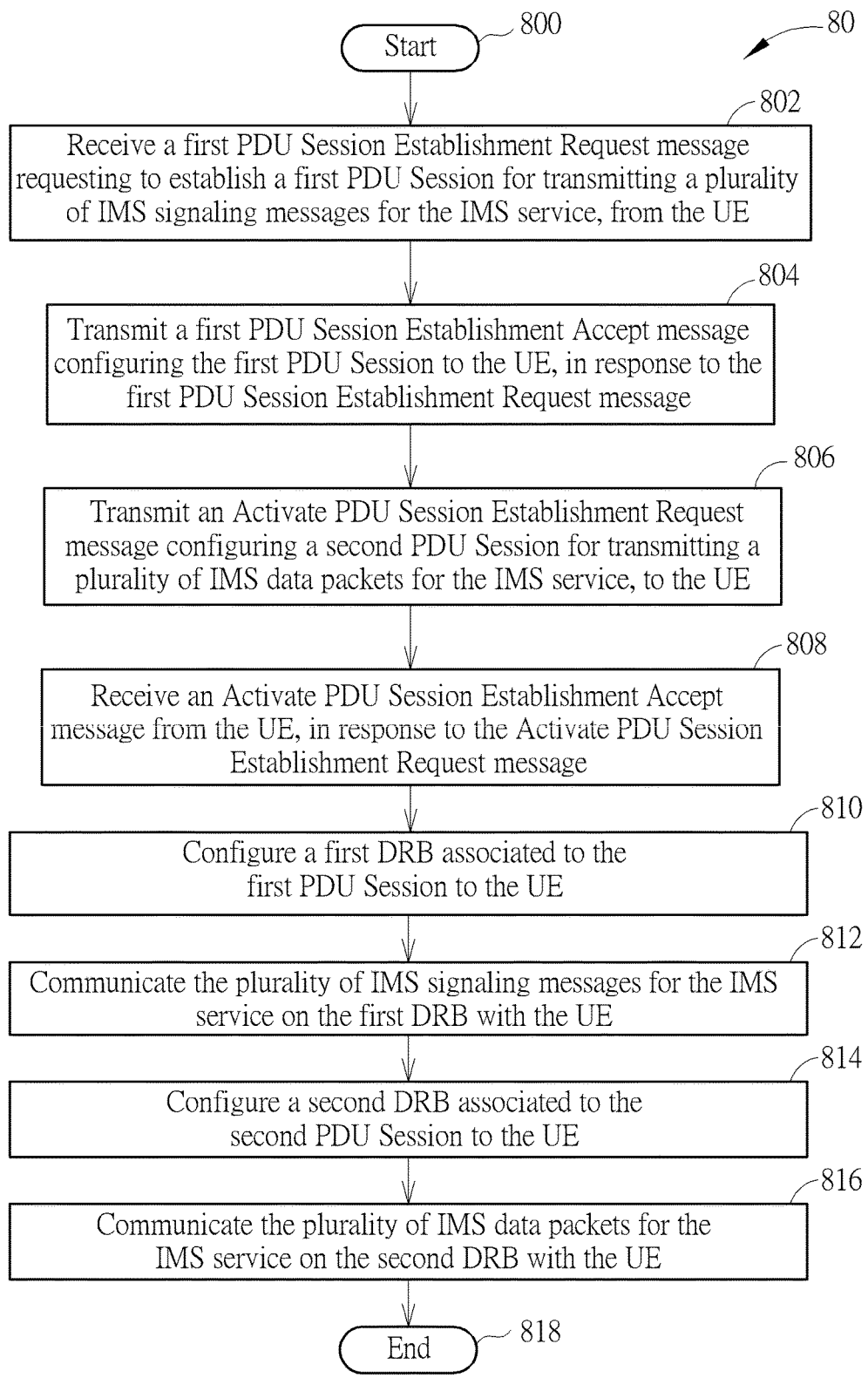
FIG. 8 is a flowchart of a process according to an example of the present invention.

A process 80 as shown in FIG. 8 is utilized in a network, to perform an IMS service with a UE, and includes the following steps:

Step 800: Start.

Step 802: Receive a first PDU Session Establishment Request message requesting to establish a first PDU Session for transmitting a plurality of IMS signaling messages for the IMS service, from the UE.

Step 804: Transmit a first PDU Session Establishment Accept message configuring the first PDU Session to the UE, in response to the first PDU Session Establishment Request message.

Step 806: Transmit an Activate PDU Session Establishment Request message configuring a second PDU Session for transmitting a plurality of IMS data packets for the IMS service, to the UE.

Step 808: Receive an Activate PDU Session Establishment Accept message from the UE, in response to the Activate PDU Session Establishment Request message.

Step 810: Configure a first DRB associated to the first PDU Session to the UE.

Step 812: Communicate the plurality of IMS signaling messages for the IMS service on the first DRB with the UE.

Step 814: Configure a second DRB associated to the second PDU Session to the UE.

Step 816: Communicate the plurality of IMS data packets for the IMS service on the second DRB with the UE.

Step 818: End.

According to the process 80, the first PDU Session Establishment procedure (i.e., Steps 802 and 804) is initiated by the UE, and the second PDU Session Establishment procedure (i.e., Steps 806 and 808) is initiated by the network.

Figure 9:
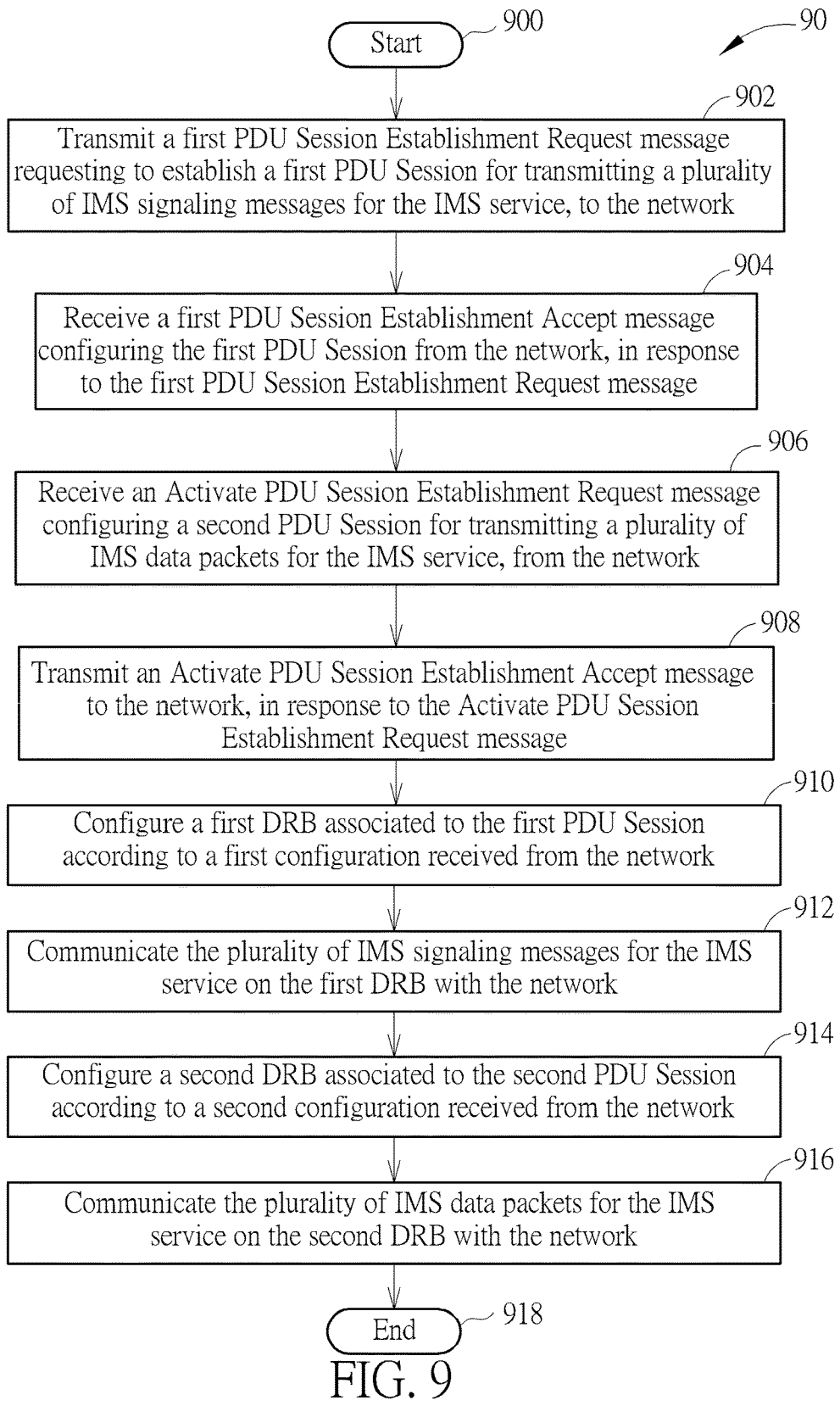
FIG. 9 is a flowchart of a process according to an example of the present invention.

A process 90 as shown in FIG. 9 is utilized in a UE, to perform an IMS service with a network, and includes the following steps:

Step 900: Start.

Step 902: Transmit a first PDU Session Establishment Request message requesting to establish a first PDU Session for transmitting a plurality of IMS signaling messages for the IMS service, to the network.

Step 904: Receive a first PDU Session Establishment Accept message configuring the first PDU Session from the network, in response to the first PDU Session Establishment Request message.

Step 906: Receive an Activate PDU Session Establishment Request message configuring a second PDU Session for transmitting a plurality of IMS data packets for the IMS service, from the network.

Step 908: Transmit an Activate PDU Session Establishment Accept message to the network, in response to the Activate PDU Session Establishment Request message.

Step 910: Configure a first DRB associated to the first PDU Session according to a first configuration received from the network.

Step 912: Communicate the plurality of IMS signaling messages for the IMS service on the first DRB with the network.

Step 914: Configure a second DRB associated to the second PDU Session according to a second configuration received from the network.

Step 916: Communicate the plurality of IMS data packets for the IMS service on the second DRB with the network.

Step 918: End.

According to the process 90, the first PDU Session Establishment procedure (i.e., Steps 902 and 904) is initiated by the UE, and the second PDU Session Establishment procedure (i.e., Steps 906 and 908) is initiated by the network.

The following examples may be applied to the processes 80-90.

In one example, the network transmits the Activate PDU Session Establishment Request message, when receiving an IMS signaling message (e.g., an INVITE message or an IMS Registration Request message) from the UE or when receiving the first PDU Session Establishment Request message or a first PDU Session Establishment Complete message responding to the first PDU Session Establishment Accept message. In one example, the network transmits a trigger message, when receiving an IMS signaling message (e.g., an INVITE message) from the UE on the first DRB. In one example, the UE transmits the first PDU Session Establishment Request message, when initiating the IMS service. In one example, the UE transmits the first PDU Session Establishment Request message, when initiating an IMS registration procedure.

In one example, the network associates the second PDU Session to the first PDU Session in the Activate PDU Session Establishment Request message. For example, the network includes a first PDU Session identity of the first PDU Session in the Activate PDU Session Establishment Request message. Thus, the UE knows the second PDU Session associated to the first PDU Session. In one example, the UE associates the second PDU Session to the first PDU Session, and include the first PDU Session identity in the Activate PDU Session Establishment Complete message to indicate the second PDU Session associated to the first PDU Session to the network.

In one example, the network does not include any IP address in the Activate PDU Session Establishment Request message. Thus, the UE knows that the first PDU Session and the second PDU Session share the same IP address. In one example, the network allocates an IP address to the UE in the first PDU Session Establishment Accept message. In one example, the network allocates the IP address to the UE in the Activate PDU Session Establishment Request message.

In one example, the network transmits the plurality of IMS signaling messages and the plurality of IMS data packets to the UE according to the IP address (e.g., a destination IP address). The UE transmits the plurality of IMS signaling messages and the plurality of IMS data packets to the network according to the IP address (e.g., a source IP address).

In one example, the network allocates the IP address to the UE according to a DHCP instead of the first PDU Session Establishment procedure and the second PDU Session Establishment procedure. The network configures the second PDU Session associated to the first PDU Session in the Activate PDU Session Establishment Request message. The network allocates the IP address in a DHCP message transmitted to the UE.

In one example, the UE receives the first configuration and the second configuration in one or more RRC messages from the network. In one example, to associate the first DRB to the first PDU Session, a first RRC message may indicate a first DRB identity of the first DRB associated to a first PDU Session identity of the first PDU Session. For example, the first DRB configuration includes the first DRB identity and the first PDU Session identity. In one example, to associate the second DRB to the second PDU Session, a second RRC message may indicate a second DRB identity of the second DRB associated to a second PDU Session identity of the second PDU Session. For example, the second DRB configuration includes the second DRB identity and the second PDU Session identity. In one example, the first RRC message and the second RRC message may be same or different.

The following examples may be applied to the processes 30-90.

In one example, the UE transmits the PDU Session Establishment Request message to the network, when being powered on, when (determine to) initiating the IMS service or when (determine to) initiating an IMS registration procedure.

In one example, the DRB configuration includes a DRB identity, a radio link control (RLC) configuration, a logical channel identity and/or a logical channel priority of the logical channel identity. In one example, the first configuration includes a first DRB configuration, and the second configuration includes a second DRB configuration.

In one example, the UE transmits a third PDU Session Establishment Request message to the network, to establish a third PDU Session for an internet service (e.g., web browsing, ftp, YouTube, WhatsApp, LINE, Twitter, Facebook, Gmail, Skype, etc.) provided by Internet. The network transmits a third PDU Session Establishment Accept message to the UE to accept (e.g., configure, add, setup, and so on) the third PDU Session. The network may configure a fourth DRB associated to the third PDU Session such that the UE communicates a plurality of packets on the fourth DRB with the network. In one example, the network transmits a third configuration (e.g., a third DRB configuration) configuring a fourth DRB identity of the third DRB and a third PDU Session identity of the third PDU Session (e.g., associating the fourth DRB identity to the third PDU Session identity) in a RRC message to the UE.

In one example, the network configures various (e.g., different) Quality of Service (QoS) parameters for the first DRB, the second DRB and the third DRB as described above, and enforces the QoS parameters on data transmissions on the first DRB, the second DRB and the third DRB. In one example, the QoS parameters include at least one of a QoS Class Identifier (QCI), an Allocation and Retention Priority (ARP), a Guaranteed Bit Rate (GBR) or a Non-GBR, a Maximum Bit Rate (MBR), an Aggregate Maximum Bit Rate (AMBR), a Packet Delay Budget, a Packet Error Loss Rate and a Priority.

In one example, the UE may or may not indicate a preferred QoS configuration, a QoS preference or a QoS profile index in the PDU Session Establishment Request message or in a PDU Session Establishment Complete message in response to the PDU Session Establishment Accept message. In one example, the network may or may not indicate a QoS profile or includes QoS parameters or the preferred QoS configuration in the PDU Session Establishment Accept message or in the Activate PDU Session Establishment Request message.

In one example, when the UE or the network terminates the IMS service (e.g., ends the IMS voice call) or the IMS video service, the network transmits a RRC message releasing the first DRB and the second DRB to the UE. In one example, the UE or the network initiates a PDU Session Release procedure to release the first PDU Session or the second PDU Session. In one example, the UE or the network does not initiate the PDU Session Release procedure in order to keep the first PDU Session or the second PDU Session.

In one example, the plurality of IMS signaling messages include SIP messages. In one example, the IMS service includes an IMS voice call or IMS video call. The plurality of IMS data packets include a plurality of IMS voice packets and/or IMS video packets.

"communicate . . . with" comprises "transmit . . . to" or "receive . . . from". "when initiating" may be replaced by "to initate". "configure" comprises "add" or "establish".

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for performing an IMS service. The network and the communication device communicate IMS signaling messages and IMS data packets for the IMS service on DRBs associated to one or more PDU Sessions. Thus, the problem of performing the IMS service is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network for performing an Internet Protocol (IP) Multimedia Subsystem (IMS) service with a communication device, comprising:
   a storage device; and
   a processing circuit, coupled to the storage device, wherein the storage device stores, and the processing circuit is configured to execute instructions of:
   receiving a Protocol Data Unit (PDU) Session Establishment Request message requesting to establish a PDU Session for the IMS service, from the communication device;
   transmitting a PDU Session Establishment Accept message configuring the PDU Session to the communication device, in response to the PDU Session Establishment Request message;
   configuring a plurality of data radio bearers (DRBs) associated to the PDU Session for the IMS service to the communication device;
   communicating a plurality of IMS signaling messages for the IMS service on a first DRB of the plurality of DRBs with the communication device; and
   communicating a plurality of IMS data packets for the IMS service on a second DRB of the plurality of DRBs with the communication device.

2. The network of claim 1, wherein the instructions further comprise:
   configuring a third DRB associated to the PDU Session for the IMS service to the communication device, if the IMS service is an IMS video service;
   communicating a plurality of IMS voice packets for the IMS video service on the second DRB with the communication device; and
   communicating a plurality of IMS video packets for the IMS video service on the third DRB with the communication device.

3. The network of claim 1, wherein the instructions further comprise:
   configuring the first DRB to associate to the PDU Session to the communication device, by transmitting a first radio resource control (RRC) configuration comprising a PDU Session identity of the PDU Session and a first DRB identity of the first DRB to the communication device; and
   configuring the second DRB to associate to the PDU Session to the communication device, by transmitting a second RRC configuration comprising the PDU Session identity of the PDU Session and a second DRB identity of the second DRB to the communication device.

4. A communication device for performing an Internet Protocol (IP) Multimedia Subsystem (IMS) service with a network, comprising:
a storage device; and
a processing circuit, coupled to the storage device, wherein the storage device stores, and the processing circuit is configured to execute instructions of:
transmitting a Protocol Data Unit (PDU) Session Establishment Request message requesting to establish a PDU Session for the IMS service, to the network;
receiving a PDU Session Establishment Accept message configuring the PDU Session from the network, in response to the PDU Session Establishment Request message;
configuring a plurality of data radio bearers (DRBs) associated to the PDU Session for the IMS service according to at least one configuration received from the network;
communicating a plurality of IMS signaling messages for the IMS service on a first DRB of the plurality of DRBs with the network; and
communicating a plurality of IMS data packets for the IMS service on a second DRB of the plurality of DRBs with the network.

5. The communication device of claim 4, wherein the instructions further comprise:
configuring a third DRB associated to the PDU Session for the IMS service according to the at least one configuration received from the network, if the IMS service is an IMS video service;
communicating a plurality of IMS voice packets for the IMS video service on the second DRB with the network; and
communicating a plurality of IMS video packets for the IMS video service on the third DRB with the network.

6. The communication device of claim 4, wherein the PDU Session Establishment Request message comprises a PDU Session identity of the PDU Session, and the PDU Session Establishment Accept message comprises the PDU Session identity of the PDU Session.

7. The communication device of claim 4, wherein the instruction further comprises:
transmitting the PDU Session Establishment Request message to the network, when being powered on, initiating the IMS service or initiating an IMS registration procedure.

8. A first communication device for performing an Internet Protocol (IP) Multimedia Subsystem (IMS) service with a second communication device, comprising:
a storage device; and
a processing circuit, coupled to the storage device, wherein the storage device stores, and the processing circuit is configured to execute instructions of:
performing a first Protocol Data Unit (PDU) Session Establishment procedure to establish a first PDU Session for transmitting a plurality of IMS signaling messages for the IMS service with the second communication device;
performing a second PDU Session Establishment procedure to establish a second PDU Session for transmitting a plurality of IMS data packets for the IMS service with the second communication device;

configuring a first data radio bearer (DRB) associated to the first PDU Session to communicate with the second communication device;
communicating the plurality of IMS signaling messages for the IMS service on the first DRB with the second communication device;
configuring a second DRB associated to the second PDU Session to communicate with the second communication device; and
communicating the plurality of IMS data packets for the IMS service on the second DRB with the second communication device.

9. The first communication device of claim 8, wherein the first communication device is a user equipment (UE) and the second communication device is a network, or the first communication device is the network and the second communication device is the UE.

10. The first communication device of claim 8, wherein the instructions further comprise:
configuring the second DRB and a third DRB associated to the second PDU Session to communicate with the second communication device, if the IMS service is an IMS video service; and
transmitting a plurality of IMS voice packets for the IMS video service on the second DRB to the second communication device; and
transmitting a plurality of IMS video packets for the IMS video service on the third DRB to the second communication device.

11. The first communication device of claim 8, wherein the instruction of performing the first PDU Session Establishment procedure to establish the first PDU Session for transmitting the plurality of IMS signaling messages for the IMS service to the second communication device, comprising:
receiving a first PDU Session Establishment Request message requesting to establish the first PDU Session, from the second communication device; and
transmitting a first PDU Session Establishment Accept message configuring the first PDU Session to the second communication device, in response to the first PDU Session Establishment Request message.

12. The first communication device of claim 11, wherein the instruction of performing the second PDU Session Establishment procedure to establish the second PDU Session for transmitting the plurality of IMS data packets for the IMS service to the second communication device, comprising:
receiving a second PDU Session Establishment Request message requesting to establish a second PDU Session, from the second communication device; and
transmitting a second PDU Session Establishment Accept message configuring the second PDU Session to the second communication device, in response to the second PDU Session Establishment Request message.

13. The first communication device of claim 8, wherein the instruction of performing the second PDU Session Establishment procedure to establish the second PDU Session for transmitting the plurality of IMS data packets for the IMS service to the second communication device, comprising:
transmitting an Activate PDU Session Establishment Request message configuring the second PDU Session, to the second communication device; and receiving an Activate PDU Session Establishment Accept message from the second communication device, in response to the Activate PDU Session Establishment Request message.

\* \* \* \* \*